United States Patent

Kodera et al.

[11] Patent Number: 5,221,981
[45] Date of Patent: Jun. 22, 1993

[54] PRODUCTION OF LIQUID CRYSTAL DEVICE INCLUDING ALIGNING TREATMENT BY RUBBING

[75] Inventors: Yasuto Kodera, Fujisawa; Masaaki Suzuki; Masanobu Asaoka, both of Yokohama, all of Japan

[73] Assignee: Canon Kabushiki Kaisha, Tokyo, Japan

[21] Appl. No.: 756,545

[22] Filed: Sep. 9, 1991

[30] Foreign Application Priority Data

Sep. 11, 1990 [JP] Japan ................................ 2-239022

[51] Int. Cl.$^5$ .............................................. G02F 1/133
[52] U.S. Cl. ...................................................... 359/76
[58] Field of Search ............................. 359/75, 76, 100

[56] References Cited

U.S. PATENT DOCUMENTS

| | | | |
|---|---|---|---|
| 4,192,060 | 3/1980 | Washizuka et al. | 359/76 |
| 4,561,726 | 12/1985 | Goodby et al. | 359/78 |
| 4,589,996 | 5/1986 | Inoue et al. | 252/299.65 |
| 4,592,858 | 6/1986 | Higuchi et al. | 252/299.66 |
| 4,596,667 | 6/1986 | Inukai et al. | 252/299.65 |
| 4,613,209 | 9/1986 | Goodby et al. | 359/104 |
| 4,614,609 | 9/1986 | Inoue et al. | 252/299.66 |
| 4,622,165 | 11/1986 | Kano et al. | 252/299.65 |
| 4,869,577 | 9/1989 | Masaki | 359/76 |
| 5,075,790 | 12/1991 | Hayashi et al. | 359/76 |

FOREIGN PATENT DOCUMENTS

| | | | |
|---|---|---|---|
| 0052124 | 2/1989 | Japan | 359/76 |
| 0069920 | 3/1991 | Japan | 359/76 |

OTHER PUBLICATIONS

Meyer, et al., "Ferroelectric Liquid Crystals," *Le Journal de Physique Letters*, 36 (L-69), 1975.
Clark, "Submicro-Second Bistable Electrooptic Switching in Liquid Crystals," *Applied Physics Letters*, 36 (II), 1980.
Kotai Butsuri, "Ekisho (Liquid Crystals)," *Solid State Physics*, 16 (141), 1981.

*Primary Examiner*—William L. Sikes
*Assistant Examiner*—Huy K. Mai
*Attorney, Agent, or Firm*—Fitzpatrick, Cella, Harper & Scinto

[57] ABSTRACT

In a successive rubbing treatment for providing a large number of substrates each having an alignment control layer with a uniaxial alignment axis for aligning a liquid crystal, a plurality of substrates are rubbed alternately with one or the other side of pile yarn planted on a rubbing cloth wound about a roller. A liquid crystal is disposed between a pair of substrates which are selected from the plurality of substrates thus treated by rubbing. By this process, a larger number of substrates can be imparted with a uniaxial alignment control power without causing a lowering in the alignment control power.

4 Claims, 4 Drawing Sheets

PRODUCTION OF LIQUID CRYSTAL DEVICE INCLUDING ALIGNING TREATMENT BY RUBBING

FIELD OF THE INVENTION AND RELATED ART

The present invention relates to a process for producing a liquid crystal device characterized by a method of rubbing for alignment control of liquid crystal, and also a liquid crystal device obtained thereby.

Conventional liquid crystal devices have a structure including a pair of substrates each having thereon a transparent electrode and an alignment film, and a liquid crystal disposed between the substrates so as to be in contact with the alignment film for aligning the liquid crystal.

Hitherto, as a method of aligning treatment for forming such an alignment film, rubbing has been used. The rubbing method is a method of rubbing a substrate in one direction with a cloth having pile yarn, etc., to align liquid crystal molecules along the rubbed direction. The rubbing has to be applied to the entire surface of a substrate as a uniform aligning treatment and has been conventionally effected in a manner illustrated in FIG. 3 in order to provide a good productivity. Referring to FIG. 3, a rubbing cloth 302 is wound about a cylindrical rubbing roller 301 and pile yarn planted onto the rubbing cloth 302 is caused to contact a substrate 101 (or 101a). The rubbing roller 301 is rotated in a direction A or B while the substrate 101 (101a) or the rubbing roller 301 is moved in parallel relative to the other, whereby the entire surface of the substrate 101 (101a) is subjected to an aligning treatment. Such a treatment has been conventionally applied.

In order to effect an identical aligning treatment for mass production, the rotation direction (A or B) of the rubbing roller 301 and the direction of movement (C or D) of the substrate 101 or the rubbing roller 301 are fixed to apply a rubbing treatment to a large number of substrates.

However, such a conventional rubbing method of using a fixed rotation direction of a rubbing roller is found to cause severe wearing of pile yarn planted to the rubbing cloth because the substrates are rubbed by only one side of the pile yarn. Further, the pile yarn is gradually inclined in one direction so that the uniaxial alignment control power imparted to the substrate is gradually weakened as the number of the aligning treatment applied to the substrates is increased, thus failing to provide a uniform alignment state of a liquid crystal. Accordingly, the rubbing cloth has to be renewed in a short period.

SUMMARY OF THE INVENTION

In view of the above-mentioned problems of the prior art, an object of the present invention is to provide a process for production of liquid crystal devices wherein a larger number of substrates are treated by rubbing without weakening the uniaxial alignment control power while preventing the unidirectional inclination of the pile yarn on the rubbing cloth.

In one aspect, the present invention provides a process for producing a liquid crystal device, including the steps of applying a successive rubbing treatment, wherein a plurality of substrates each having an alignment control layer are successively treated by rubbing using a rubbing cloth including a pile yarn so that a first substrate is rubbed by one side of the pile yarn, a second substrate is rubbed by an opposite side of the pile yarn, and subsequent substrates are alternately rubbed with one or the opposite side of the pile yarn, and disposing a liquid crystal between a pair of substrates selected from the plurality of substrates thus treated by rubbing, to form a cell structure.

According to the process of the present invention, the inclination of pile yarn is effectively prevented, so that a larger number of substrates can be treated by rubbing with a rubbing cloth while retaining a satisfactory level of uniaxial alignment control power.

According to the present invention, there is also provided a liquid crystal device prepared through the above-mentioned process.

These and other objects, features and advantages of the present invention will become more apparent upon a consideration of the following description of the preferred embodiments of the present invention taken in conjunction with the accompanying drawings, wherein like parts are denoted by like reference numerals.

DESCRIPTION OF THE PREFERRED EMBODIMENTS

Figure 1:
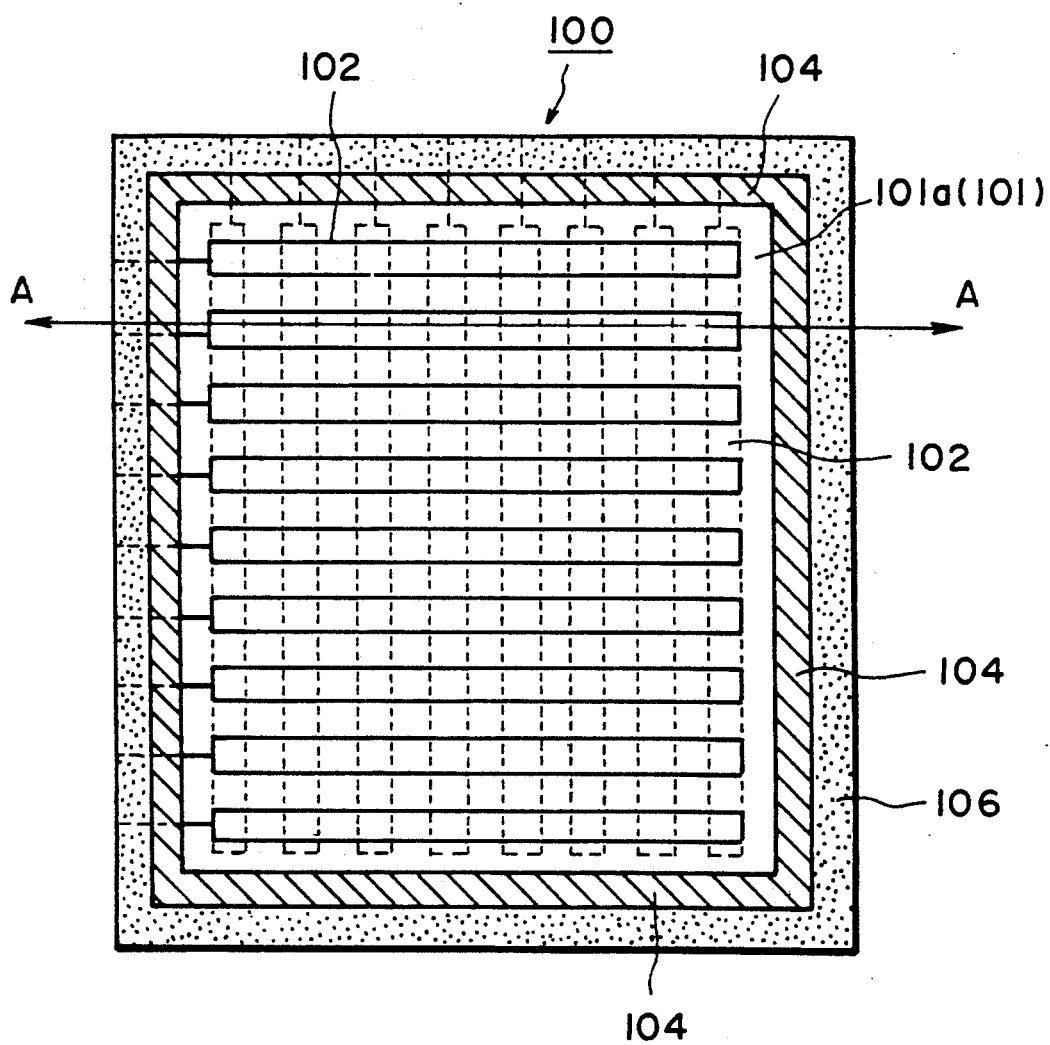
FIG. 1 is a plan view of a liquid crystal device obtained by the present invention.
Figure 2A:
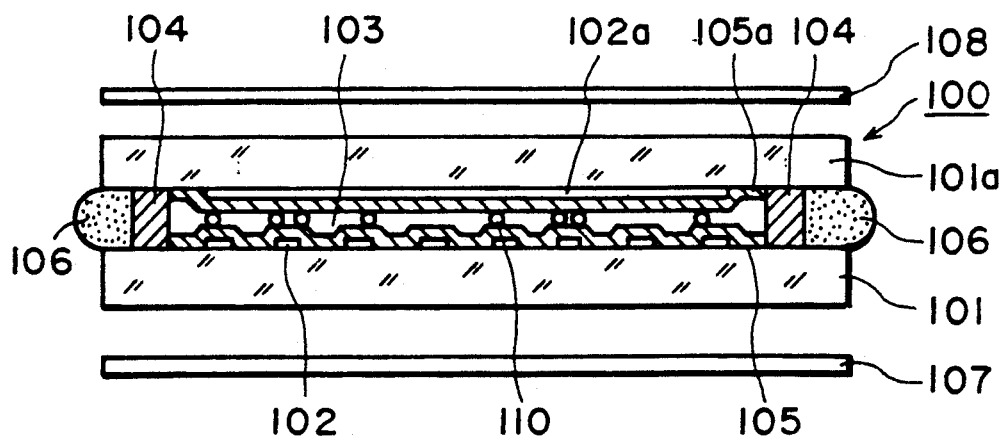
FIGS. 2A-2C are respectively a schematic sectional view of an embodiment of a liquid crystal device having a plan view as shown in FIG. 1 taken along the line A—A in FIG. 1.
Figure 2B:
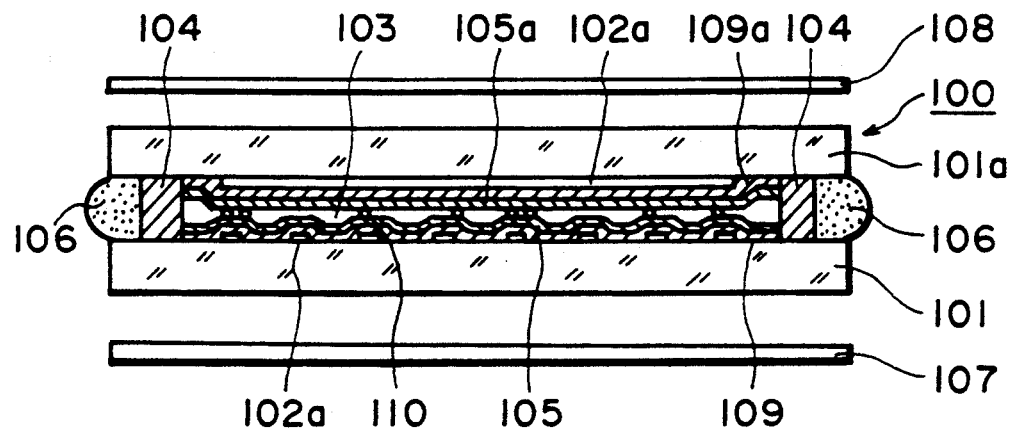
Figure 2C:
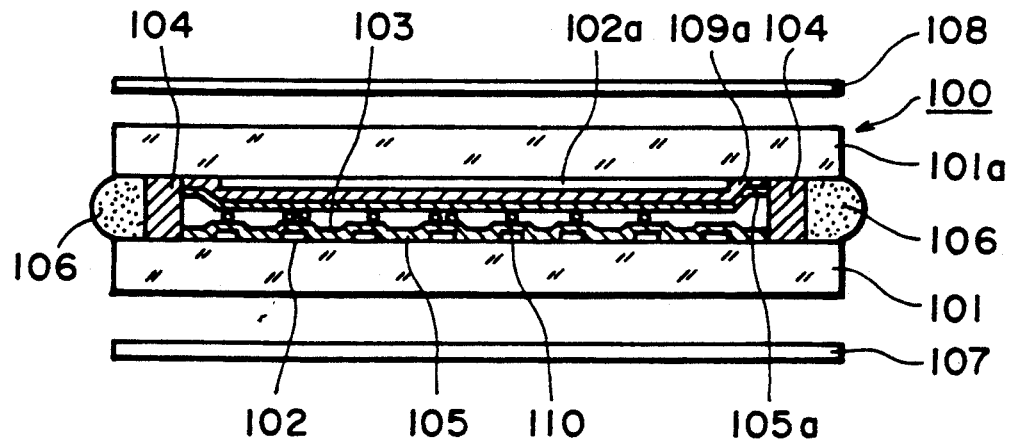

FIG. 1 is a plan view of an embodiment of a liquid crystal device according to the present invention capable of having various sectional views as shown in FIGS. 2A-2C each taken along the line A—A in FIG. 1.

Referring to FIG. 1 and FIGS. 2A-2C, such a liquid crystal device (cell structure) 100 includes a pair of substrates 101 and 101a made of glass plates or plastic plates which are held with a prescribed gap by a spacer 104 and spacer beads 110, and is sealed with an adhesive 106 to form a cell structure. On the substrate 100 is further formed an electrode group (e.g., an electrode group for applying a scanning voltage of a matrix electrode structure) including a plurality of transparent electrodes 102 in a prescribed pattern of, e.g., stripes. On the substrate 101a is formed another electrode group (e.g., an electrode group for applying signal voltages of the matrix electrode structure) including a plurality of transparent electrodes 102a intersecting the above-mentioned transparent electrodes 102 (see FIG. 1). A liquid crystal 103 is disposed between the substrates 101 and 101a. Such a cell structure 100 is sandwiched between a pair of polarizers 107 and 108 to form a liquid crystal display apparatus.

On at least one of the transparent electrodes 102 and 102a, an insulating film for preventing short circuit may be disposed but is omitted in the embodiment shown in FIG. 2A, so that the transparent electrodes 102 and 102a on the substrates 101 and 101a are directly covered with alignment control films 105 and 105a.

On the other hand, in an embodiment shown in FIG. 2B, the substrates 101 and 101a are respectively provided with insulating films 109 and 109a and alignment control films 105 and 105a, respectively.

Further, in an embodiment shown in FIG. 2C, the substrate 101a is provided with an insulating film 109a for short circuit prevention and an alignment control film 105a, but the substrate 101 is provided with an alignment control film without such an insulating film for short circuit prevention.

The alignment control films 105 and 105a may include a film of an inorganic insulating material, such as silicon monoxide, silicon dioxide, aluminum oxide, zirconia, magnesium fluoride, cerium oxide, cerium fluoride, silicon nitride, silicon carbide, and boron nitride; or an organic insulating material, such as polyvinyl alcohol, polyimide, polyamideimide, polyesterimide, polyparaxylylene, polyester, polycarbonate, polyvinyl acetal, polyvinyl chloride, polyamide, polystyrene, cellulose resin, melamine resin, urea resin and acrylic resin. A film of the above-mentioned inorganic insulating material may also function as an insulating film for preventing short circuit. Particularly, the alignment control films 105 and 105a in the liquid crystal device shown in FIG. 2A may suitably be composed of a film of an inorganic insulating material having functions of both alignment control and short circuit prevention. The alignment control films 105 and 105a in the liquid crystal devices shown in FIGS. 2B and 2C may preferably be formed in a thickness of 50 Å–1500 Å.

The alignment control films 105 and 105a, after being formed as films of an inorganic insulating material or an organic insulating material as described above, may be provided with a uniaxial alignment axis by rubbing the films in one direction with a rubbing cloth having pile yarn on its surface. In the rubbing treatment according to the present invention, a substrate is rubbed with one side of pile yarn, and a subsequent substrate is rubbed with the opposite side of the pile yarn. Then, the rubbing treatment is continued for subsequent substrates by repeating the above-treatments with alternating sides of the pile yarn.

The insulating films 109 and 109a for short circuit prevention may preferably be formed as a film of an inorganic insulating material, such as $SiO_2$, $TiO_2$, $Al_2O_3$, $Si_3N_4$ and $BaTiO_3$, in a thickness of a least 200 Å, more preferably at least 500 Å.

The films may be formed by sputtering, ion-beam evaporation or application of an organic precursor compound, such as organo-titanium compound, organo-silane compound and organo-aluminum compound, followed by calcination. The organo-titanium compound may include: alkyl (e.g., methyl, ethyl, propyl, butyl, etc.) titanates; and the organo-silane compounds may include ordinary silane coupling agents. If the thickness of the insulating film for short circuit prevention 109 or 109a is below 200 Å, a sufficient short circuit-prevention effect may not be achieved. On the other hand, if the thickness exceeds 5000 Å, an effective voltage application to the liquid crystal is hindered. Accordingly, the thickness may be set to 200–5000 Å, preferably 500–2000 Å.

The alignment control given by the rubbing according to the present invention is generally effective for various liquid crystals inclusive of: nematic, smectic, chiral smectic and cholesteric liquid crystals. However, it is particularly effective for a smectic liquid crystal, particularly a ferroelectric smectic liquid crystal, having a delicate alignment characteristic. More specifically, it is possible to use a liquid crystal in chiral smectic C phase (SmC*), chiral smectic G phase (SmG*), chiral smectic F phase (SmF*), chiral smectic I phase (SmI*), or chiral smectic H phase (SmH*).

Details of ferroelectric liquid crystals are described in, e.g., LE JOURNAL DE PHYSIQUE LETTERS, 36 (L-69) 1975, "Ferroelectric Liquid Crystals"; Applied Physics Letters, 36 (11), 1980, "Submicro-Second Bistable Electrooptic Switching in Liquid Crystals"; Kotai Butsuri (Solid State Physics), 16 (141), 1981, "Ekisho (Liquid Crystals)"; U.S. Pat. Nos. 4,561,726; 4,589,996; 4,592,858; 4,596,667; 4,613,209; 4,614,609 and 4,622,165. Ferroelectric liquid crystals disclosed in these references may be used in the present invention.

Specific examples of ferroelectric liquid crystals may include: decyloxybenzylidene-p'-amino-2-methylbutylcinnamate (DOBAMBC), hexyloxybenzylidene-p'-amino-2-chloropropylcinnamate (HOBACPC), and 4-O-(2-methyl)butylresorcylidene-4'-octylaniline (MBR8).

When used in a liquid crystal device, such a ferroelectric liquid crystal is remarkably affected with an aligning treatment with respect to its alignment and drive performance, so that the effect of the present invention is particularly pronounced for such a ferroelectric liquid crystal.

The spacer beads 110 may be composed of a wide variety of known materials including alumina and silica as particularly preferred examples. The spacer beads may be dispersed according to a known method, preferably by spraying or by using a spinner. More specifically, spacer beads 110 may be dispersed in a volatile solvent, such as flon (fluorocarbons, chlorofluorocarbons), isopropyl alcohol, ethanol or a mixture of these solvents, and then dispersed by spraying or by using a spinner.

The spacer beads may preferably be dispersed at a rate of 100–1000 beads/$mm^2$, although this rate may vary depending on their size and the liquid crystal material used in combination therewith.

Figure 3:
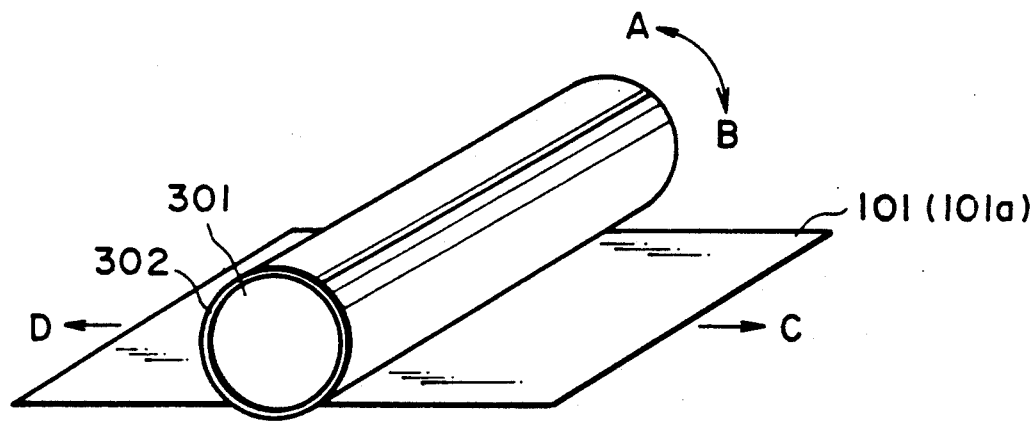
FIG. 3 is a schematic perspective view for illustrating a manner of a rubbing treatment of a substrate.
Figure 4A:
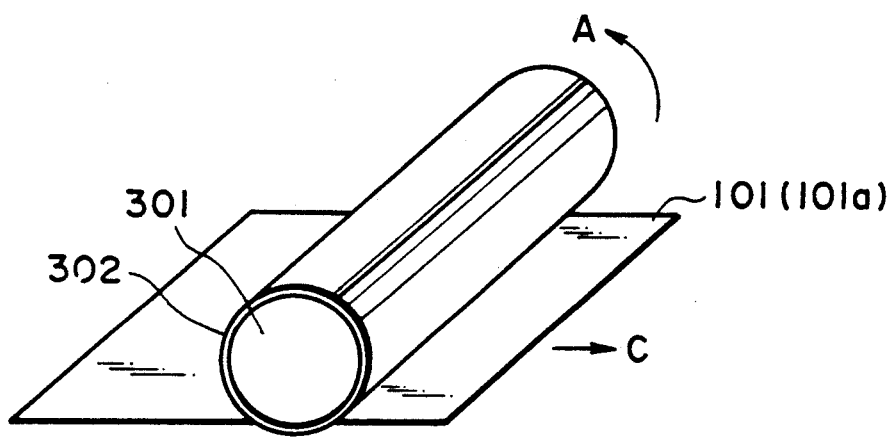
FIGS. 4A and 4B are respectively a schematic plan view for illustrating a manner of rubbing according to an embodiment of the present invention.
Figure 4B:
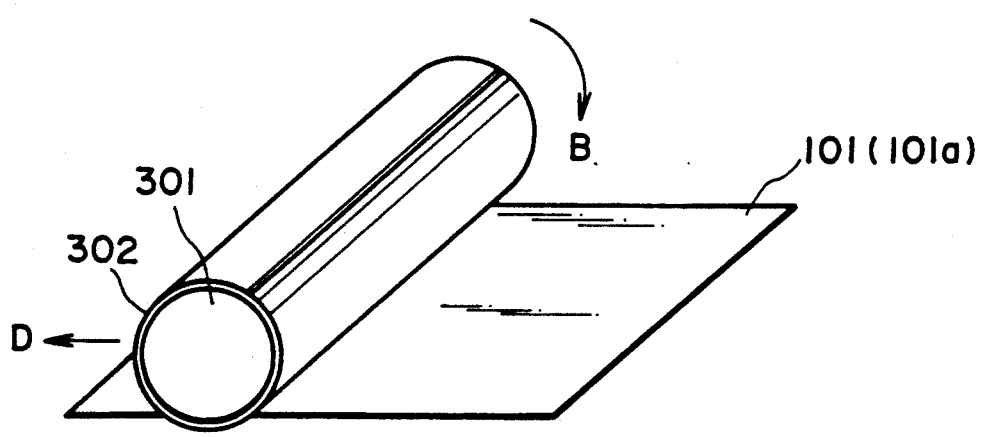
Figure 5:
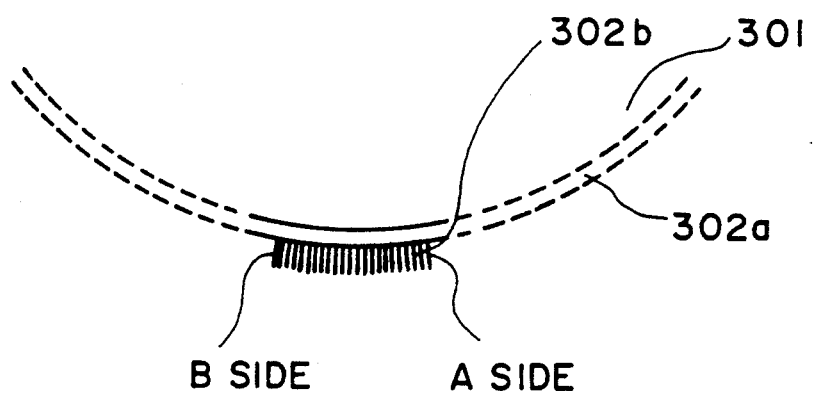
FIG. 5 is a sectional view of a rubbing roller having a rubbing cloth applied thereto.

The rubbing according to the present invention is performed in the above-described manner as illustrated in FIG. 3 by rotating a rubbing roller 301 coated with a rubbing cloth 302 (including a substrate 302a planted with pile yarn 302b as shown in FIG. 5) in a direction of A (B) preferentially (with a larger peripheral speed) relative to a substrate 101 (101a) moving in a concurrent direction C (D) or in a counter direction D (C), preferably in a concurrent direction C (D) as shown in FIGS. 4A and 4B, so that the pile yarn 302b contacts the substrate 101 (101a) with its A side (B side). As described earlier, the substrate 101 treatment and the substrate 101a treatment using the A side and the B side, respectively, of the pile yarn 302b are repeated alternately for a large number of substrates.

The rubbing cloth 302 may be any rubbing cloth having pile yarn used for ordinary rubbing. The pile yarn may be composed of any suitable material, including, for example, nylon polyester, acetate or cotton.

Hereinbelow, the present invention is explained based on Example and Comparative Example.

EXAMPLE

A liquid crystal device having a section as shown in FIG. 2B was prepared.

Two 1.1 mm-thick square glass plates having a diagonal size of 10 inches were provided as substrates 101 and 101a, and each substrate was provided with stripe electrodes 102 and 102a, respectively, of ITO. Then, 1000 Å-thick SiO$_2$ films were formed on each substrate by sputtering to provide insulating films 109 and 109a, which were then coated with a polyimide-forming liquid by a spinner, followed by 1 hour of heat-curing at 300° C. to form 200 Å-thick polyimide alignment films 105 and 105b.

One hundred substrates (electrode plates) were prepared in the above described manner and then successively subjected to rubbing by using a cylindrical rubbing roller 301 provided with a rubbing cloth 302 having nylon pile yarn applied thereabout. The rubbing roller 301 was rotated in the direction A while moving the substrate 101 (101a) in the direction C as shown in FIG. 4A for each odd-numbered substrate, and the rubbing roller 301 was rotated in the direction B while moving the substrates 101 (101a) in the direction D as shown in FIG. 4B for each even-numbered substrate. As a result, referring to FIG. 5, the side A of the pile yarn 302b was used for rubbing the odd-numbered substrates and the opposite side B of the pile yarn 302b was used for rubbing the even-numbered substrates.

In the rubbing operation, the rubbing roller 301 was a cylindrical roller having a diameter of 80 mm and rotated at 1000 rpm, while the substrate 101 (101a) t was moved at a rate of 30 mm/sec with a contact margin of the pile yarn 302b of 0.35 mm for 1 mm-long pile yarn. Herein, the contact margin of pile yarn of 0.35 mm means that the rubbing roller 301 was shifted from a point where the tip of the pile yarn 302b just contacted the substrate 101, toward the substrate 101 further by 0.35 mm.

Then, 5 pairs of the substrates, after the above rubbing treatment, i.e., the 1st and 2nd substrates, 29th and 30th substrates, 59th and 60th substrates, and 99th and 100th substrates, were respectively applied to each other with alumina spacer beads 110 having an average diameter of about 1.5 micron disposed therebetween so that their rubbing directions are in parallel with each other to form 5 cells. More specifically, the alumina bead spacers 110 were dispersed in a mixture of flon/ethanol (=75/25 by volume) and dispersed by spraying onto one substrate of each pair of substrates uniformly at a rate of 300 beads/mm$^2$.

Then, each of the five cells was filled with a ferroelectric liquid crystal ("CS-1014" (trade name) available from Chisso K. K.) and, after sealing, was cooled for alignment from 95° C. giving an isotropic phase to 25° C. at a rate of 0.3° C./min. to form a liquid crystal cell. Incidentally, the liquid crystal ("CS-1014") showed a phase transition series of

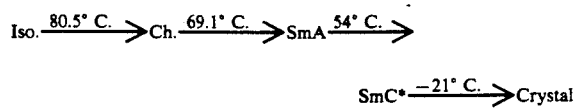

in the cell.

The alignment characteristics of the five liquid crystal cells thus prepared were evaluated and the results are shown in Table 1 appearing hereinafter.

COMPARATIVE EXAMPLE

One hundred substrates were treated in the same manner as in the above example up to the formation of the polyimide alignment film and then successively subjected to rubbing in the same manner as in the above Example except that all the substrates were treated in the manner illustrated in FIG. 4A using only the A side of the pile yarn 302b (FIG. 5).

Then, similarly as in the above Example, 5 pairs of the substrates thus treated by rubbing, i.e., the 1st and 2nd substrates, 9th and 10th substrates, 29th and 30th substrates, 59th and 60th substrates, and 99th and 100th substrates, were respectively applied to each other, otherwise in the same manner as in the above Example to form five cells, which were then filled with an identical liquid crystal and cooling for alignment in the same manner as in Example to form five liquid crystal cells for comparison.

The alignment characteristics of the five liquid crystal cells thus prepared are also shown in Table 1 below.

TABLE 1

| | Alignment State | | | | |
| | Cell obtained by using a pair of: | | | | |
| | 1st and 2nd substrate | 9th and 10th substrate | 29th and 30th substrate | 59th and 60th substrate | 99th and 100th substrate |
|---|---|---|---|---|---|
| Example | ○ | ○ | ○ | ○ | ○ |
| Comparative Example | ○ | ○ | ○ | Δ-x | x |

Note:
○: No defect.
Δ-x: Uniaxial alignment was partially lost.
x: Many defects. Uniaxial alignment was lost at an areal rate of about 40%.

As is understood from the results of the above Example and Comparative Example, a larger number of substrates can be treated by rubbing without incurring a lowering in alignment control power by alternately using both sides of pile yarn on a rubbing cloth for successive substrates.

As described above, according to the present invention, in a rubbing treatment of substrates by using a rubbing cloth having pile yarn planted thereon, one substrate is rubbed with one side of the pile yarn and then a subsequent substrate is rubbed with the other side of the pile yarn. By repeating the above rubbing treatments by using both sides of pile yarn alternately, a larger number of substrates can be imparted with a uniaxial alignment control power without causing a lowering in the alignment control power.

What is claimed is:

1. A process for producing a liquid crystal device, comprising the steps of:
   applying a successive rubbing treatment, wherein a plurality of substrates each having an alignment control layer are successively moved and treated by rubbing with a rubbing cloth comprising pile yarn wound about a roller, said roller being rotated in a direction of movement of a substrate being rubbed and at a velocity greater than a velocity of movement of the substrate being moved, so that a first substrate is rubbed by one side of the pile yarn, a second substrate is rubbed by an opposite side of the pile yarn, and any subsequent substrates are alternately rubbed by said one or the opposite side of the pile yarn, selecting a pair of substrates from among the plurality of substrates rubbed by applying the successive rubbing treatment, one of the selected pair being rubbed by said one side of the pile yarn and the other of the selected pair being rubbed by the opposite side of the pile yarn, disposing a selected pair of substrates opposite each other with a gap therebetween, and disposing a chiral smectic liquid crystal between the selected pair of substrates.

2. A process according to claim 1, wherein said selected pair of substrates comprises an odd-numbered substrate and an even-numbered substrate successively treated in the successive rubbing treatment.

3. A liquid crystal device, comprising; a pair of substrates and a chiral smectic liquid crystal disposed between the substrates, wherein each of said pair of substrates is selected from a plurality of substrates treated by a successive rubbing treatment in which the plurality of substrates each having an alignment control layer are successively moved and treated by rubbing with a rubbing cloth comprising pile yarn wound about a roller, said roller being rotated in a direction of movement of a substrate being rubbed and at a velocity greater than a velocity of movement of the substrate, so that a first substrate is rubbed by one side of the pile yarn, a second substrate is rubbed by an opposite side of the pile yarn, and any subsequent substrates are alternately rubbed with said one or the opposite side of the pile yarn.

4. A device according to claim 3, wherein said selected pair of substrates comprises an odd-numbered substrate and an even-numbered substrate treated in the successive rubbing treatment.

* * * * *

UNITED STATES PATENT AND TRADEMARK OFFICE
CERTIFICATE OF CORRECTION

PATENT NO. : 5,221,981

DATED : June 22, 1993

INVENTOR(S) : YASUTO KODERA, ET AL.

It is certified that error appears in the above-identified patent and that said Letters Patent is hereby corrected as shown below:

COLUMN 8

Line 3, "comprising;" should read --comprising:--.

Signed and Sealed this

Fifteenth Day of March, 1994

Attest:

BRUCE LEHMAN

Attesting Officer     Commissioner of Patents and Trademarks